Jan. 10, 1939.  A. R. ALLARD  2,143,465
TURBINE DIAPHRAGM
Original Filed July 30, 1936   2 Sheets—Sheet 1

WITNESSES:

INVENTOR.
ARTHUR R. ALLARD.
BY
ATTORNEYS.

Jan. 10, 1939.  A. R. ALLARD  2,143,465
TURBINE DIAPHRAGM
Original Filed July 30, 1936   2 Sheets—Sheet 2

WITNESSES:

INVENTOR.
ARTHUR R. ALLARD
BY
ATTORNEYS.

Patented Jan. 10, 1939

2,143,465

UNITED STATES PATENT OFFICE 2,143,465

TURBINE DIAPHRAGM

Arthur R. Allard, Drexel Hill, Pa., assignor to Westinghouse Electric & Manufacturing Company, East Pittsburgh, Pa., a corporation of Pennsylvania Original application July 30, 1936, Serial No. 93,514. Divided and this application December 22, 1937, Serial No. 181,090

4 Claims. (Cl. 253—77)

This application is a division of my application, Serial No. 93,514, filed July 30, 1936, and it relates to a blading assembly or diaphragm construction particularly useful in connection with steam turbines.

An object of the present invention is to provide a blading assembly comprising blades having their end portions connected to inner and outer members so as to provide a structure of adequate strength to oppose pressure differences as well as smooth passages for fluid flow.

A further object of my invention is to provide a blading construction wherein the inner ends of the blades are rooted within the periphery of an inner member and the outer ends are embodied in a cast outer member.

A further object of my invention is to provide a blading assembly comprising a holding member having arcuate grooves extending transversely of its periphery with blades disposed in the grooves, one face of each blade contacting with one side wall of its groove and the grooves being of greater circumferential extent than the blades so as to leave recesses between the other faces of the blades and the other side walls of the grooves, and weld metal being arranged in the recesses and providing autogenous connections of said other faces of the blades with the groove bottoms and said other groove side walls.

These and other objects are effected by my invention as will be apparent from the following description and claims taken in connection with the accompanying drawings forming a part of this application, in which:

Figure 1:
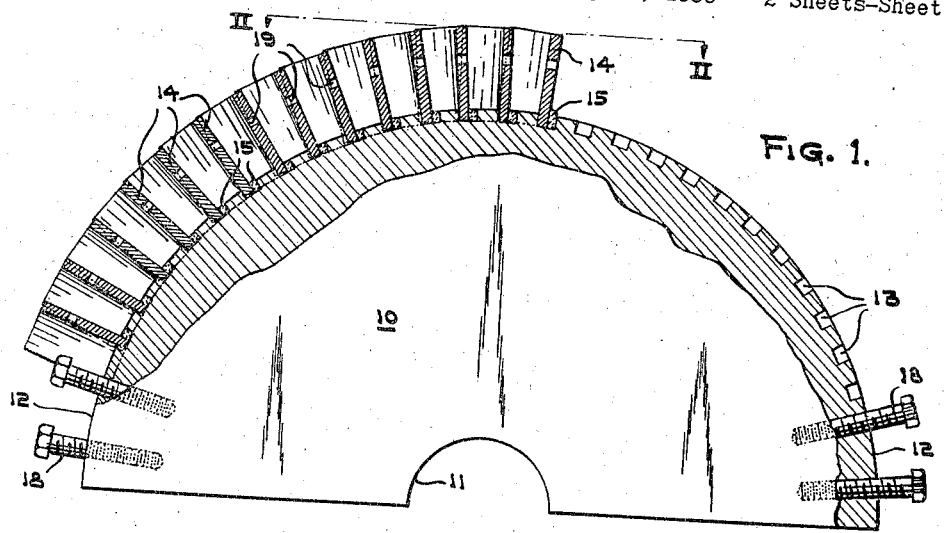
Fig. 1 is a view of an inner holding member with the peripheral portion and part of a blade row shown in section therewith.
Figure 2:
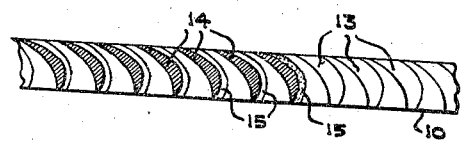
Fig. 2 is a fragmentary view taken along the curved section II—II of Fig. 1 and looking in the direction of the arrows.
Figure 3:
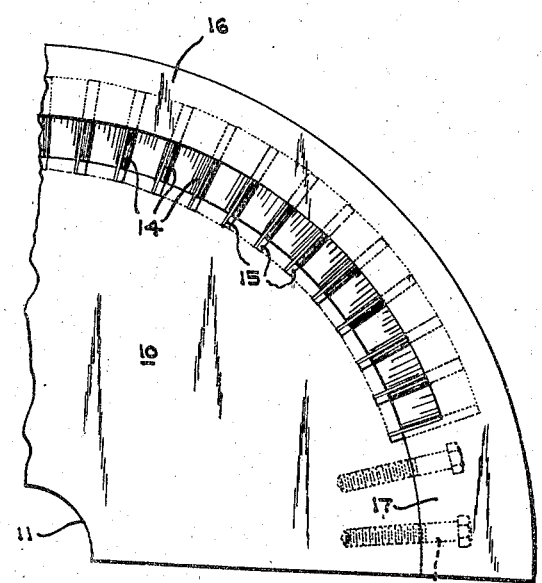
Fig. 3 is a fragmentary side elevational view of the diaphragm.

Referring now to the drawings more in detail, in Figs. 1, 2, and 3, there is shown a holding member, at 10, preferably made of steel plate of suitable thickness and having a central opening 11 for a shaft or spindle. The holding member has arcuate grooves 13 extending transversely of its periphery to receive the inner or root portions of blades 14, such blades being firmly anchored, rooted, and braced in the recesses by means of weld metal 15 forming autogenous connections between the blades and the holding member. The outer ends of the blades are embodied in a cast outer member, the latter preferably having extensions 17 beyond the ends of the blade row for attachment by the screws 18 to the inner member 10. (See Fig. 3.)

In Figs. 1, 2, and 3, the blades 14 are of uniform section from end to end and the concave faces thereof are conjugate to the convex side walls of the grooves 13. The grooves 13 have greater arcuate extent than the root portions of the blades with the result that, with the concave faces of the root portions contacting with the convex side walls of the grooves, recesses are left between the convex faces of the root portions and the concave side walls of the grooves. Weld metal 15 is deposited in such recesses, the weld metal joining autogenously the convex faces of the root portions with the bottoms of the grooves and the concave side walls of the latter as well as completely filling the recesses so as to provide a connection of adequate strength and stiffness, the weld metal not only filling the recesses and binding the blades to the holding member but providing keys or packing pieces between the blades and the holding member groove side walls such that the blades are very stiffly held in place.

The outer end portions of the blades preferably have openings 19 formed therein so that, when the outer member 16 is cast thereabout, metal thereof will extend through the openings to secure a firmer anchorage of the outer member to the blades.

Figure 4:
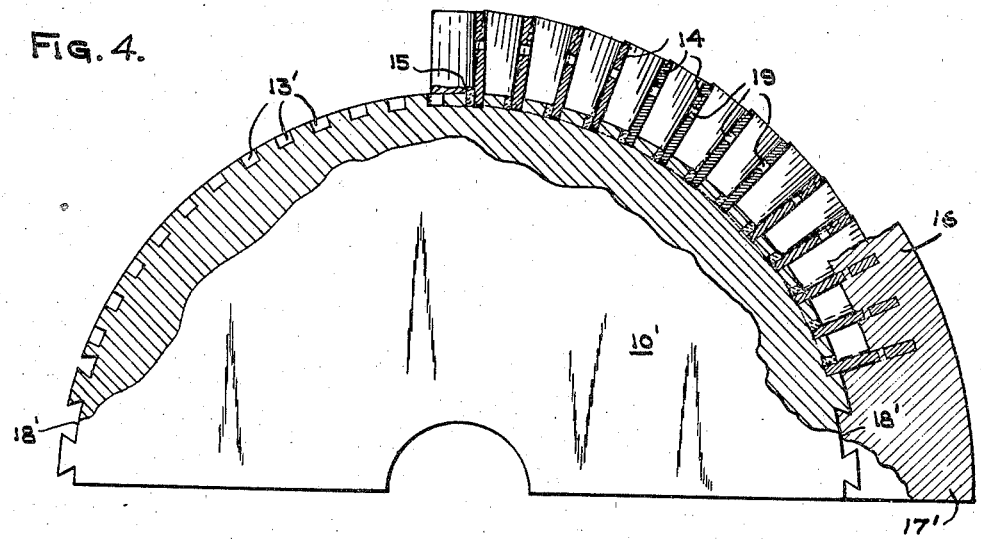
Figs. 4 and 5 are views similar to Figs. 1 and 2 but showing an alternative and preferred connection of the blades to the holding member; and, Fig. 6 is a fragmentary view showing in greater detail the connection of the blades to the holding member.
Figure 5:
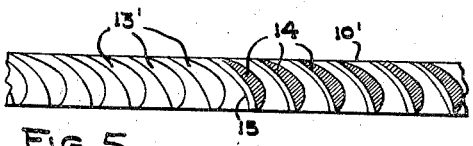
Figure 6:
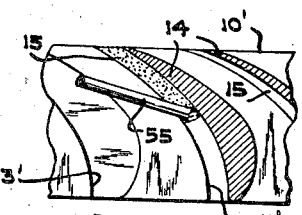

In the preferred form of my invention shown in Figs. 4, 5, and 6, the construction is similar to that already described except that the grooves 13' of the holding member 10' have concave side walls thereof conjugate to the convex faces of the blade root portions and contacting with the latter, the weld metal 15 autogenously joining the concave faces of the root portions with the bottoms of the recesses and the convex side walls of the grooves.

In Fig. 6, there is shown a blade root portion held in place in a groove with the convex face thereof conjugate to the concave groove side wall and contacting with the latter, this view showing a partial deposition of weld metal 15 in a recess between the concave root portion face and the convex side wall of the groove together with the weld rod 55 providing the source of weld metal.

From the foregoing, it will be apparent that I have devised a blading assembly, particularly useful in connection with steam turbines, wherein blades are firmly rooted in a holding member and are stiffly anchored or keyed thereto by means of weld metal forming autogenous connections between the blades and the holding member. Such an assembly is particularly useful in the construction of diaphragms, in connection with which it is preferred to use a cast outer member embodying the outer ends of the blades, the cast outer member preferably having end portions connected to the inner member beyond the ends of the blade row. A diaphragm so constructed, not only has adequate strength to resist pressure differences thereacross, but the construction affords passages of arcuate and predetermined dimensions and having smooth surfaces.

The term "blading", as used herein, is to be understood to apply to stationary or moving blades or to partitions forming nozzle passages.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a blade row assembly, a holding member having curved grooves extending transversely of its periphery, blades extending radially from the periphery of the holding member and having curved root portions disposed in the grooves with one surface of each root portion conjugate to and in contact with one lateral surface of its groove, said grooves being of greater circumferential extent than the root portions, so that, with said conjugate root portion and groove lateral surfaces contacting, curved recesses are left between the other root portion surfaces and the other lateral surfaces of the grooves, and weld metal filling the recesses and forming autogenous connections of said other surfaces of the root portions with said other lateral surfaces of the grooves.

2. In a blade row assembly, a holding member having curved grooves extending transversely of its periphery, blades extending radially from the periphery of the holding member and having curved root portions disposed in the grooves and having concave and convex faces, said convex faces being conjugate to and in contact with concave side walls of the grooves, said grooves having greater circumferential extent than the root portions so that, with convex faces thereof contacting the concave side walls of the grooves, arcuate recesses are left between the concave faces of the root portions and the convex side wall of the grooves, and weld metal filling the recesses and forming autogenous connections of the concave faces of the root portions with the convex side walls of the grooves.

3. A diaphragm element comprising an inner disk member having curved grooves extending transversely of its periphery, nozzle-forming partitions extending radially from the periphery of the disk member and having curved root portions located in said grooves and having concave and convex faces, said concave faces being conjugate to and in contact with the convex walls of the grooves, said grooves being of greater circumferential extent than the root portions so as to provide recesses between the convex faces of the root portions and the concave groove side walls, and weld metal filling the recesses and forming autogenous connections of the convex faces of the root portions with the concave groove side walls.

4. A diaphragm element comprising an inner disk member having curved grooves extending transversely of its periphery, partition members extending radially of the disk member and having curved inner end portions disposed in said grooves, the inner end portions each having one face conjugate to and in contact with one side wall of its groove and the grooves being of greater circumferential extent than the inner end portions so that curved recesses are left between the other faces of the latter and the other groove side walls, and weld metal in the grooves filling the recesses and forming autogenous connections between said other faces of the inner end portions and said other groove side walls, an arcuate cast member embodying the outer end portions of the partition members, and means for connecting the end portions of the arcuate cast member to the disk member.

ARTHUR R. ALLARD.